United States Patent Office 3,734,721
Patented May 22, 1973

3,734,721
PRODUCTION OF NICKEL POWDER FROM
BASIC NICKEL CARBONATE
Willie Seibt, Edmonton, and Donald Robert Weir, Fort
Saskatchewan, Alberta, Canada, assignors to Sherritt
Gordon Mines Limited, Toronto, Ontario, Canada
No Drawing. Filed June 21, 1971, Ser. No. 155,328
Int. Cl. C22b 23/04
U.S. Cl. 75—108                                15 Claims

ABSTRACT OF THE DISCLOSURE

Basic nickel carbonate which contains sulphur and undesirable impurities such as magnesium, aluminum, manganese, iron, zinc and silica is slurried in aqueous media and is reacted with hydrogen under conditions which are controlled such that the nickel content of the slurry is reduced to elemental powder form while the impurities are converted to insoluble compounds which are only physically associated with the nickel powder and, therefore, readily separable therefrom. Specifically, any sulphur in the reduction slurry that is not in sulphate form is first oxidized to sulphate form and then sufficient compatible acid neutralizing reagent, such as ammonia, is provided in the slurry to produce a pH in the reduction end solution above about 3.5 and preferably between about 5 and about 7. With such pH control in the reduction operation the impurities in the basic nickel carbonate feed material are precipitated as a mixture of hydroxides and carbonates physically mixed with nickel powder product. The nickel powder product is separated from the reduction end solution and from the impurities precipitate by simple mechanical means such as magnetic decantation and is then washed with water and/or weak acid solution to remove any residual impurities. The final product is a high purity nickel powder which meets ASTM specifications with respect to metal impurities.

---

This invention relates to a hydrometallurgical process for producing substantially pure nickel powder from basic nickel carbonate containing sulphur and other impurities such as magnesium, aluminum, maganese, cobalt, iron, zinc and silica. The invention also relates, in accordance with particularly important optional features thereof, to methods for working-up nickel bearing ammonium carbonate leach solutions which contain the aforesaid impurities to provide impure basic nickel carbonate for treatment by the nickel production process of the invention.

It is known to recover nickel values from nickel-bearing oxidic and sulphidic ores by methods involving leaching with ammoniacal ammonium carbonate solutions under oxidizing conditions. For example, United States Pat. No. 2,400,098 describes a process in which nickeliferous laterite ore is treated by first roasting the ore under reducing conditions to selectively convert nickel values in the material to a form soluble in ammonium carbonate solution and then leaching the reduced material with such solution under oxidizing conditions to dissolve nickel values in the solution. Canadian Pat. No. 811,078 describes a modification of these processes for treating nickel and cobalt bearing laterites whereby the proportion of cobalt recovered is substantially increased by controlling the initial cobalt content of the leach solution through selective removal of cobalt from leach liquor recycle streams. It is also known, as described in Canadian Pat. No. 530,842, for example, to roast, selectively reduce and then leach nickeliferous sulphide material in ammoniacal ammonium carbonate solution to extract the nickel values. Conventionally, the nickel is recovered from leach liquors produced by these and similar prior art methods simply by boiling the leach solution to drive off ammonia and carbon dioxide and precipitate dissolved nickel as a basic nickel carbonate compound. This precipitate is then heated to convert it to a nickel oxide product. Although these processes are suitable for extracting nickel and cobalt from oxidic and sulphidic ores and concentrates, the nickel product obtained thereby is contaminated by impurities such as magnesium, aluminum, manganese, iron, silica and zinc in amounts which often exceed the strict specifications of today's nickel users.

An alternative procedure for recovering nickel from such ammonium carbonate liquors which has the advantage of enabling the production of the nickel in metallic powder form is described in Canadian Pat. No. 811,079. Briefly, according to this process, the pregnant liquor is first heated to drive off ammonia and carbon dioxide to precipitate nickel from solution as basic nickel carbonate. This initial basic nickel carbonate precipitate is separated from solution and is re-dissolved in substantially pure ammoniacal ammonium carbonate solution to produce a concentrated nickel ammine carbonate solution. The undissolved solids, which contain manganese, iron, magnesium, silica and other impurities, are separated from the resulting solution and the solids-free solution is heated to re-precipitate at least a part of the dissolved nickel as basic nickel carbonate. The resulting slurry is reacted with a free oxygen bearing gas at an elevated temperature to oxidize sulphur values to sulphate form and the so-treated slurry is then reacted with hydrogen at elevated temperature and pressure to produce a substantially pure elemental nickel product. Although this process does produce a substantially pure nickel product, it involves a number of time consuming and technically difficult operations. These include the re-dissolution of the initial basic nickel carbonate precipitate (usually a two-stage dissolution operation is required), slimes separation from the concentrated nickel ammine carbonate solution, recovery of co-precipitated nickel from the slimes, re-precipitation of pure basic nickel carbonate, separation of the pure basic nickel carbonate from barren liquor and recovery of ammonia and carbon dioxide during these steps. A further disadvantage is that relatively high equipment, operating and maintenance costs would be involved in carrying out these various operations in a large scale commercial scale operation.

The foregoing and other prior art approaches to the problem of impurities contamination in nickel produced from contaminated basic nickel carbonate systems are based on the belief that it is absolutely essential that a very pure basic nickel carbonate be provided before specification grade nickel product can be produced from the basic nickel carbonate. In the case of processes, such as that of Canadian Pat. No. 811,019, involving direct hydrogen reduction of basic nickel carbonate to elemental nickel, this belief derives from prior art teachings that foreign particles present in the reduction system are incorporated in and mechanically inseparable from the nickel powder particles produced by direct reduction. For example, United States Pat. Nos. 3,469,967 and 3,526,498 utilize this mechanism to produce composite powders comprised of a solid core material coated with a thin layer of nickel. Since impurities in contaminated basic nickel carbonate are present as finely divided insoluble compounds during the hydrogen reduction reaction, it would be expected that these compounds would be incorporated in the nickel powder product produced by direct reduction of such contaminated systems. However, it has now been discovered that substantially pure nickel powder can be produced from impure basic nickel carbonate by direct reduction with hydrogen at elevated temperatures and pressures without first removing all the impurities from the basic nickel carbonate as was previously considered necessary.

According to the invention, an aqueous slurry of the impurity-containing basic nickel carbonate is prepared; the sulphur content of the resulting system is determined and any sulphur which is not in sulphate form is oxidized to sulphate form; sufficient ammonia (or equivalent compatible acid neutralizing reagent) is provided in the system to provide at least 1.8 and preferably at least 2.0 moles of ammonia per mole of determined sulphur (or an equivalent amount of other compatible acid neutralizing reagent). The so-adjusted system is then reacted with hydrogen at a temperature above about 80° C. and under a partial pressure of hydrogen above about 300 p.s.i. to precipitate nickel from the system in elemental powder form. Sulphate ions released during the reaction with hydrogen are tied up by the acid neutralizing reagent so that the pH of the reduction end solution is maintained above about 3.5. The precipitated nickel powder is separated from the reduction end solution by physical means, and is then washed to remove substantially all residual impurities therefrom.

The significant and surprising feature of the process is that provided the system is adjusted with an acid neutralizing reagent to control the reduction end solution pH as indicated, any metal impurities such as Mg, Al, Mn, Fe, $SiO_2$ and Zn in the starting material are not incorporated in the product nickel powder particles but report as a precipitate of hydroxides and carbonates physically mixed with the nickel powder and easily separable therefrom by simple mechanical means and acid washing.

Although, in its broadest sense, the process of the present invention is independent of the source or manner of preparation of the impure basic nickel carbonate, in practice, it will normally form part of an integrated, overall process for recovering nickel from leach solutions such as are derived from leaching lateritic ores. As such, it may optionally include a number of specific procedures for use when the source of the impure basic nickel carbonate is nickel ammonium carbonate leach solution obtained by methods such as those described in Canadian Pat. No. 811,078 for example. In most cases, such leach solutions contain, in addition to 5–20 grams per litre (g.p.l.) of dissolved nickel, impurities such as sulphur, cobalt, copper, magnesium, manganese, zinc, iron and silica. It is known from Canadian Pat. No. 631,939 to remove cobalt and copper contaminants from such solutions by reacting them with a soluble sulphidizing agent such as $H_2S$, $(NH_4)_2S$, $Na_2S$ or NaHS, prior to heating the solution to precipitate basic nickel carbonate. Cobalt and copper-free basic nickel carbonate produced in this way may be slurried with water or ammonium carbonate solution and treated directly according to the present invention to produce substantially pure nickel powder. However, the invention includes two alternative procedures for working up such leach solutions to provide a particularly suitable basic nickel carbonate slurry for the process. The first of these, which may be used to particular advantage where the leach solution contains relatively large amounts of sulphur and maganese, aluminum and/or iron contaminants, involves, firstly the selective removal of cobalt and copper from the leach solution in accordance with known methods such as that described in Canadian Pat. No. 631,939. The cobalt and copper free solution is then contacted with a free oxygen bearing, oxidizing gas such as air, at a temperature in the range of about 65° C. to about 175° C. under a partial pressure of oxygen above about 5 p.s.i. preferably at about 30 p.s.i. for a time sufficient to precipitate manganese, aluminum and iron contaminants as hydroxides and to convert unsaturated sulphur compounds in the solution to sulphate form. The manganese, aluminum and iron precipitate is separated from the solution by conventional filtration or clarification procedures. The clarified solution is then heated to drive off $NH_3$ and $CO_2$ and precipitate basic nickel carbonate. This precipitate preferably is separated from the barren solution and washed to remove any remaining traces of unsaturated sulphur compounds before being slurried with water to provide the aqueous basic nickel carbonate slurry for treatment in the subsequent steps of the process. In cases where the amount of sulphur contamination is relatively low, e.g. less than 2 g.p.l., or in cases where high sulphate ion levels are not objectionable in the subsequent reduction steps, it is only necessary to thicken the basic nickel carbonate slurry. All that is required in this case is that sufficient barren liquor be decanted to provide a basic nickel carbonate slurry of the concentration desired for the reduction operation.

The just described manganese-aluminum-iron impurity precipitation and sulphur impurity oxidation procedure has the advantage that the bulk of the manganese, aluminum and/or iron contaminants are removed from the solution prior to the basic nickel carbonate precipitation operation thereby eliminating or substantially diminishing the scaling problems that otherwise occur in this precipitation operation. Also, sulphur contaminants such as sulphides and polythionates are oxidized to sulphate form at much lower temperatures than are required to effect the same result in a concentrated basic nickel carbonate slurry.

The second alternative procedure for working up such contaminated leach liquors to provide a basic nickel carbonate slurry suitable for the subsequent direct reduction step of the invention involves treatment of leach solution which contains cobalt but which is substantially copper-free, i.e. solution which is either initially copper-free because of the nature of the ore treated or which has been treated to remove copper. This solution is contacted with a free oxygen bearing, oxidizing gas at a temperature within the range of about 65° C. to about 175° C. to convert substantially all cobalt values in the solution to cobaltic form. At the same time, manganese, aluminum and/or iron are precipitated from solution and sulphur compounds are oxidized to sulphate form in the same manner as in the procedure described in the preceding paragraph. A small amount of cobalt, usually about less than 4% of that in solution, may also report with the manganese-aluminum-iron impurity precipitate. This impurity precipitate is separated, such as by clarification of the solution, and the clarified solution is boiled to drive off $NH_3$ and $CO_2$ and precipitate basic nickel carbonate product with a nickel/cobalt ratio of about 25–40:1 after separation from the barren solution and washing. When this precipitate is reduced with hydrogen in the subsequent steps of the process, essentially all the cobalt reports with the manganese, zinc and other impurity compounds in the reduction-end products and is separated from the nickel powder product with these compounds.

Which of the foregoing basic nickel carbonate slurry precipitation procedures is utilized is a matter of choice depending on the composition of the solution from which the nickel is to be recovered and the specific economic and operating factors applicable in each particular case. For example, although large amounts of impurity metal hydroxides can be separated from the nickel powder product after the reduction step, in some commercial scale operations it may be desirable to minimize the quantity of impurities solids that must be separated from the nickel powder product. Removal of the bulk of the manganese, iron and/or aluminum contaminants prior to the basic nickel carbonate precipitation step is a simple way of achieving this. Another factor that must be considered is that selective removal of cobalt from ammonium carbonate leach liquors by reaction with sulphidizing agents is technically difficult to carry out without also precipitating at least an equal amount of nickel. Thus, this amount of nickel is recovered as lower value mixed cobalt-nickel sulphide rather than as pure nickel. However, this disadvantage may be offset where the mixed nickel-cobalt sulphides can be marketed at a satisfactory price and where reagent costs are not unduly high, e.g. where low-cost hydrogen sulphide is available for stripping the cobalt from solution. On the other hand, when these conditions do not prevail, it may be preferable to utilize the second alternative procedure thereby increasing the recovery of elemental nickel product and eliminating the reagent costs for stripping cobalt from solution. In this case, the cobalt will be concentrated in the impurity residue and can be recovered therefrom if desired.

For the direct reduction operation, the aqueous slurry of impurities containing basic nickel carbonate preferably is adjusted to contain from about 40 to about 150 g.p.l. of nickel. These limits are not critical to the operativeness of the process but represent the desirable range from a practical operating and economic point of view. The preferred nickel concentration for most cases is about 80–100 g.p.l. The nickel may be all in the form of solid basic nickel carbonate or it may be partly in solution as nickel ammine carbonate and in cases where a part of the nickel content is in solution, a part of the impurities may also be in solution.

If the slurry contains sulphur in a form other than sulphate, i.e. if all sulphur values in the slurry have not been oxidized to sulphate form during the previous processing history of the basic nickel carbonate, then it must be treated in a high temperature oxidation step prior to reduction in order to ensure conversion of sulphur values to sulphate form. If this is not done, the nickel powder product from the direct reduction operation will be contaminated with insoluble sulphide sulphur compounds. In the sulphur oxidation operation, the slurry of basic nickel carbonate and solution is charged into a pressure vessel, such as an autoclave, and is heated to a temperature within the range of about 65° C. to about 260° C., preferably about 175° C. to about 230° C. The slurry is actively agitated and an oxygen bearing, oxidizing gas, such as air, oxygen, enriched air or oxygen is fed into the agitated slurry at a rate sufficient to maintain a partial pressure of oxygen above about 5 p.s.i. preferably between about 20 and 50 p.s.i. This operation is continued until substantially all sulphur values in the system are oxidized to sulphate form, generally a period of about 5 to 30 minutes. It will be noted that the optimum temperature required for oxidation of sulphur values in this slurry is considerably higher than that described previously for oxidizing sulphur values in leach solution containing dissolved nickel and impurities. Also, oxidation of sulphide sulphur and unsaturated sulphur compounds in the slurry system usually results in the slurry becoming very viscous making it difficult to obtain efficient oxygen mass transfer. For this reason, in most cases, it is preferable to effect sulphur compound oxidation in the solution prior to precipitation of the basic nickel carbonate rather than in the slurry system.

In carrying out the reduction operation of the invention, it is first necessary to determine the sulphur content of the feed slurry and then provide sufficient ammonia or other compatible acid neutralizing reagent therein to ensure that there is at least 1.8 and preferably 2.0 moles of ammonia in the system per mole of sulphur or an equivalent amount of other compatible acid neutralizing reagent. "Compatible acid neutralizing reagent" as used herein means any basic compound which is capable of combining with sulphate ions in solution to form a soluble sulphate compound which will remain stable under the conditions used for direct reduction of the nickel from the solution by reaction with hydrogen. In most cases, ammonia will be employed as the acid neutralizing reagent since it generally will be readily available at any commercial installations utilizing the process of the invention. However, in special cases, it may be advantageous to use other reagents such as alkali metal hydroxides or carbonates. The purpose of providing an acid neutralizing reagent in the reduction system is to ensure that substantially all $SO_4^-$ ions released during the reduction reaction are tied up such that the pH of the reduction-end solution will be above about 3.5 and preferably above about 5.

The sulphate ions are released during the reduction reaction as a result of the reaction of nickel sulphate in the reduction feed with hydrogen to form elemental nickel and $H_2SO_4$. Thus, the quantity of $SO_4^-$ ions released will depend on the amount of nickel sulphate in the feed slurry, which, in turn, depends on the quantity of sulphur in the feed in excess of that which is tied up by soluble sulphate forming metal impurities such as zinc, in the feed slurry. In any case, with an amount of neutralizing reagent equivalent to an ammonia to sulphur molar ratio greater than 2.0, all $SO_4^-$ ions will be tied up as a soluble sulphate compound and the reduction-end pH will be above 7. With an amount of neutralizing reagent equivalent to an ammonia to sulphur molar ratio less than 2.0, the pH of the reduction-end solution will be below 7, with the exact pH depending on the quantity of uncombined $SO_4^-$ ions in the reduction-end solution. Although a reduction-end solution pH as low as 3.5 is contemplated by the invention, a pH above about 5.0 is generally preferred in that special acid resistant and generally more expensive materials of construction are required for equipment to carry out the reduction on the lower pH systems.

The reduction feed slurry, after oxidation, where necessary, and provision adjustment of the acid neutralizing reagent requirements is treated directly in the hydrogen reduction step wherein the nickel content of the system is reduced to elemental powder form. The reducing reaction is carried out in a pressure vessel at a temperature within the range of about 80° C. to about 325° C. preferably about 150° C.–210° C. under a partial pressure of hydrogen within the range of from about 100 to about 500 p.s.i. preferably about 350 p.s.i. The reducing reaction is self-nucleating; that is, no seed or catalyst is required to initiate or promote the direct reduction of nickel in the system to elemental nickel. Additives may be provided in the reduction system for purposes of controlling the physical properties of the powder product. For example, a polyacrylic acid compound, such as that sold by American Cyanamid Company under the trade name "Acrysol," and/or a low molecular weight ethylene maleic anhydride compound, such as that sold by the Monsanto Company under the trade name EMA–11, may be added in amounts up to about 0.5 g.p.l. if it is desired to produce irregular shaped nickel powder particles having good compacting properties. The reduction is completed when consumption of hydrogen ceases, usually from about 5 to about 45 minutes under preferred operating conditions. In most cases, a series of sequential reductions or "densifications" are affected before removal of powder product from the reduction vessel. That is, reduction end solution is discharged from the autoclave after each reduction, fresh oxidized slurry and acid neutralizing reagent is added to effect a series of reductions, e.g., up to 50 or more with the powder product from each reduction functioning as "seed" for each subsequent reduction. Regardless of the number of reductions conducted, the reduction end products consist of reduction end solution and a solid fraction comprising precipitated nickel powder, silica and hydroxides and carbonates of contaminant metals such as zinc, manganese, magnesium aluminum and iron.

The nickel powder product is physically separated from the reduction end solution and the bulk of the contaminant-containing solids by any suitable means such as magnetic separation or elutriation. Any residual contaminants associated with the separated nickel powder are readily removed by washing, preferably in a weak acid solution such as a 0.5 volume percent $H_2SO_4$ solution followed by washing with water. If used, the $H_2SO_4$ wash solution preferably is recycled to the reduction feed slurry make-up step to minimize soluble nickel losses. Other mineral or organic acid solutions, such as hydrochloric, nitric acid or acetic acid solutions could be employed for washing but these are generally less economic and chemically less compatible with the nickel-ammonium carbonate system than sulphuric acid.

The reduction end solution may be discarded and, in some circumstances, it may be desirable to do so for various economic or operating reasons applicable to a particular installation utilizing the process of the invention. However, a preferred procedure and an important modification of the present invention is to recycle all or at least a portion of the reduction-end solution during each densification series. That is, for the initial reduction, impurity containing basic nickel carbonate is simply slurried in water, the slurry is oxidized if it contains sulphur in non-sulphate form, the required ammonia or other acid neutralizing reagent addition is made as previously discussed and the system is then reacted with hydrogen to reduce the basic nickel carbonate to elemental nickel powder. This powder remains in the reduction vessel and the reduction-end solution and the bulk of the impurities solids precipitated with the nickel powder are separated from the nickel powder by decanting the solution and impurities. After separation of the impurities solids, at least a part of the decanted solution is recycled to prepare the next reduction charge. The new charge is then oxidized, if necessary, adjusted to provide the required acid neutralizing reagent to sulphur molar ratio and reacted with hydrogen as in the preceding reduction. This procedure is repeated for the desired number of reductions or "densifications" with at least a part of the reduction end solution from each preceding reduction being used to make up the basic nickel carbonate slurry for each subsequent reduction. When the densification series or "densification cycle" as it is sometimes referred to in the art, has been completed, in most cases after about fifty reductions, the powder product is discharged and another densification cycle commenced.

In recycling reduction end solution during a densification series, the soluble sulphate compound concentration will increase with each successive cycle as a result of the combination of the added acid neutralizing reagent with $SO_4^=$ ions released during reduction of each successive charge of contaminated basic nickel carbonate feed until an equilibrium level is reached. This level will depend on the amount of sulphur in the basic nickel carbonate feed, the concentration of the feed slurry and the proportion of reduction end solution recycled. In most cases, using ammonia as the acid neutralizing reagent equilibrium will be reached with an ammonium sulphate concentration in the reduction feed within the range of 40–60 g.p.l. This relatively high ammonium sulphate concentration has a favourable effect on the residual impurity level and particularly the residual zinc level of the nickel powder product. The recycle of reduction end solution also results in an increase in overall elemental nickel recovery since the small quantities of residual nickel in the recycled solution are recovered as product nickel rather than being discarded or recovered as an impure precipitate. A still further advantage of recycling where ammonia is used as the neutralizing reagent is that the increased $(NH_4)_2SO_4$ concentration facilitates recovery of ammonia from reduction end solution by lime boiling whereas when the solution is discarded, the $NH_3$ contained therein is lost.

The process of the invention is further illustrated and explained by the following examples.

EXAMPLE 1

Tests in this example were conducted on a basic nickel carbonate sample obtained by boiling solution derived from leaching lateritic nickel ore in accordance with the method described in Canadian Pat. No. 811,078. The analyses of the basic nickel carbonate sample is shown in the following Table I.

TABLE I

| | Wt. percent |
|---|---|
| Ni | 47.6 |
| Co | 0.012 |
| Cu | 0.005 |
| Fe | 0.040 |
| $NH_3$ total | 1.10 |
| $CO_2$ | 6.95 |
| $S_{total}$ | 1.86 |
| $S(as\ SO_4^{--})$ | 0.96 |
| $S(as\ S_2O_3^=)$ | 0.448 |
| Mg | 0.080 |
| Mn | 0.618 |
| Al | 0.024 |
| Zn | 0.124 |
| $SiO_2$ | 0.030 |

Samples of the basic nickel carbonate were slurried with water to provide two reduction feed charges. Each charge was placed in a high pressure autoclave and ammonia in amount in excess of that needed to form $(NH_4)_2SO_4$ with the total amount of sulphur in the feed slurry was added. (For convenience, the ammonia was added as $(NH_4)_2CO_3$ and an excess was provided because of the volatility of $NH_3$ under the test conditions). The charge was heated with agitation to 175° C. with 20 p.s.i.g. oxygen overpressure for a period of 30 minutes to oxidize the unsaturated sulphur compounds to sulphate form.

The autoclave was then cooled by decreasing the temperature to approximately 50° C., purged with nitrogen to remove oxygen and then purged with hydrogen. The autoclave was then re-heated to 175° C. and 350 p.s.i.g. hydrogen overpressure was applied for a 20-minute retention time. Details of the reduction feed charges are shown in Table II.

TABLE II

| Test No. | 1 | 2 |
|---|---|---|
| Total volume (mls.) | 2,000 | 2,000 |
| Ni (g.p.l.) | 60 | 60 |
| $(NH_4)_2SO_4$ (g.p.l.) | 5 | 5 |
| $(NH_4)_2CO_3$ (g.p.l.) | 12.6 | 6.3 |
| Reduction time (min.) | 20 | 20 |
| pH reduction-end solution | 7.8 | 6.4 |

At the completion of each reduction, nickel powder product was separated from the solution and solid residue by magnetic decantation. The powder was washed in acid solution containing 0.5% by volume $H_2SO_4$ and in water and then dried. Analyses of the powder products is shown in Table III. For comparison purposes, the ASTM standard (B39) chemical specification for nickel is shown in Table IV.

TABLE III

| | Test No. | | | |
|---|---|---|---|---|
| | 1 | | 2 | |
| | Acid washed | Not acid washed | Acid washed | Not acid washed |
| Impurity: | | | | |
| S | 0.0318 | 0.0342 | 0.0710 | 0.0420 |
| C | 0.050 | 0.066 | 0.0658 | 0.0940 |
| Co | 0.020 | 0.022 | 0.0071 | 0.012 |
| Cu | 0.0024 | 0.0029 | 0.0026 | 0.0025 |
| Fe | 0.0078 | 0.013 | 0.0084 | 0.0286 |
| Mn | 0.003 | 0.092 | 0.005 | 0.112 |
| Mg | 0.0019 | 0.010 | 0.0055 | 0.0089 |
| Zn | 0.0012 | 0.0088 | <0.001 | 0.0102 |
| Ca | <0.001 | <0.001 | <0.001 | <0.001 |
| Al | <0.001 | 0.007 | <0.001 | 0.005 |
| Si | <0.001 | <0.001 | <0.001 | <0.001 |
| Other metal impurities (by emission spectograph) | <0.001 | | <0.001 | |

TABLE IV

| Element: | Composition weight percent |
|---|---|
| Nickel, min. | 99.80 |
| Cobalt, max. | 0.15 |
| Copper, max. | 0.02 |
| Carbon, max. | 0.03 |
| Iron, max. | 0.02 |
| Sulphur, max. | 0.01 |
| Phosphorus | <0.005 |
| Manganese | <0.005 |
| Silicon | <0.005 |
| Arsenic | <0.005 |
| Lead | <0.005 |
| Antimony | <0.005 |
| Bismuth | <0.005 |
| Tin | <0.005 |
| Zinc | <0.005 |

Referring to Tables III and IV, it can be seen, that except for carbon and sulphur, the acid washed powders easily met ASTM specifications. However, sulphur and carbon do not present a problem since they are readily lowered to below 0.005 and 0.01 respectively by sintering in hydrogen.

EXAMPLE 2

This example illustrates the practice of the invention incorporating pre-oxidation of cobalt containing leach solution to oxidize all sulphur values to sulphate and also eliminate the bulk of Fe and Mn contamination and recover the bulk of the cobalt with the impurities residue. Approximately 50 litres of Ni-Co bearing solution obtained by leaching reduced laterite ore were oxidized by contact with air in a 25-gallon autoclave at 98° C. for 30 minutes using an oxygen partial pressure of 30 p.s.i.g.

The starting solution, the oxidized solution and the residue separated from the oxidized solution analyzed as shown in Table V.

TABLE V

| | Starting solution, g.p.l. | Oxidized solution, g.p.l. | Dry residue, wt. percent |
|---|---|---|---|
| Ni | 9.02 | 9.18 | 0.650 |
| $Co_{(Total)}$ | 0.328 | 0.323 | 5.16 |
| $Co^{++}$ | 0.063 | 0.005 | |
| $Co^{+++}$ | 0.265 | 0.318 | |
| Fe | 0.013 | 0.001 | 5.35 |
| $S_{(Total)}$ | 3.48 | 3.54 | 0.128 |
| $S_{(SO_4^=)}$ | 1.57 | 3.43 | 0.08 |
| Mg | 0.036 | 0.037 | 1.06 |
| Mn | 0.101 | <0.001 | 42.9 |
| Zn | 0.014 | 0.013 | 0.017 |
| Al | 0.005 | <0.001 | 1.8 |
| $NH_{3\,(Total)}$ | 86.0 | | 3.30 |
| $CO_2$ | 36.0 | | 3.88 |

The oxidized solution was clarified and boiled to drive off $NH_3$ and $CO_2$ to precipitate a mixed basic nickel-cobalt carbonate.

The precipitate was separated from the barren liquor by filtration, repulp washed once with water at room temperature and filtered again.

1665 gm. of precipitate wet cake having a moisture content of 50% and 56 litres of barren liquor were obtained. The analyses are shown in Table VI.

TABLE VI

| | Basic nickel carbonate precipitate | Barren liquor |
|---|---|---|
| Ni | 50.3 | 0.874 |
| Co | 1.35 | 0.007 |
| Fe | 0.0049 | <0.001 |
| $S_T$ | 2.73 | 2.29 |
| $S_{(SO_4^=)}$ | 2.73 | 1.88 |
| Mg | 0.055 | 0.023 |
| Mn | 0.004 | <0.0001 |
| Zn | 0.082 | 0.001 |
| Al | 0.001 | 0.001 |
| Ca | <0.001 | |
| $NH_{3(Total)}$ | 0.050 | 1.80 |
| $CO_2$ | 8.4 | 3.70 |
| Insol. | 0.044 | |

500 gm. of this basic nickel carbonate were slurried with water to a total volume of 2000 mls. 5 g.p.l. $(NH_4)_2SO_4$ and 4 g.p.l. of ammonia were added to the charge. This charge was placed in a laboratory autoclave and heated to 175° C. at which point 350 p.s.i.g. $H_2$ overpressure was applied. Reduction was complete in 25 minutes and the pH of the reduction-end solution was 5.6.

The nickel powder product was separated from a dark brown impurities precipitate and the reduction-end solution by magnetic decantation, acid washed in 0.5 vol. percent $H_2SO_4$ solution, water washed and dried.

The impurities precipitate was filtered from the reduction-end solution, displacement washed, dried and analyzed along with the nickel powder. The analyses are shown in Table VII.

TABLE VII

| | Analysis of Ni powder acid washed (wt. percent) | Analysis of impurities residue (wt. percent) |
|---|---|---|
| $S_T$ | 0.01 | 4.68 |
| Ni | Balance | *38.85 |
| $Co_T$ | 0.024 | 35.0 |
| $Co^{++}$ | | 13.0 |
| $Co^{+++}$ | | 21.90 |
| Fe | 0.001 | 0.026 |
| Mg | <0.001 | 0.008 |
| Mn | <0.0001 | 0.034 |
| Zn | <0.001 | 0.316 |
| Al | <0.001 | 0.010 |
| Ca | <0.001 | |
| $O_2$ | 0.17 | |
| C | 0.01 | |
| $CO_2$ | | 3.90 |

*The residue contained a small quantity of Ni powder product which had not been completely separated.

EXAMPLE 3

This example illustrates the same pre-oxidation procedure as in Example 2 except that the starting solution was a nickel bearing leach solution which had first been treated with $H_2S$ to remove cobalt.

60 litres of the solution was oxidized in a 25-gallon autoclave under the following conditions:

Temperature: 98° C.
$O_2$ overpressure: 30 p.s.i.g. (from start)
Total pressure: 50 p.s.i.g.
Retention time: 20 mins.

The analyses of the head solution, the oxidation end solution and oxidation end residue are shown in Table VIII.

TABLE VIII

| | Head solution | Oxidation end solution | Oxidation end residue |
|---|---|---|---|
| Ni | 9.44 | 9.08 | 4.790 |
| Co | 0.006 | 0.0146 | 0.840 |
| Cu | 0.001 | 0.003 | |
| Fe | 0.006 | <0.0001 | 3.37 |
| $S_T$ | 3.28 | 3.47 | 1.34 |
| $SO_4^=$ | 1.66 | 2.95 | |
| Mg | 0.026 | 0.022 | 2.70 |
| Mn | 0.052 | 0.0039 | 31.1 |
| Zn | 0.011 | 0.011 | 1.61 |
| Al | 0.003 | <0.001 | 1.65 |
| $NH_3T$ | 84.7 | | 1.60 |
| $CO_2$ | 28.1 | | 23.39 |

After oxidation, the solution was filtered to separate the residue and then boiled to precipitate basic nickel carbonate which was separated and given one distilled water repulp wash. Analysis of the basic nickel carbonate precipitate is shown in Table IX.

TABLE IX

| | Weight percent |
|---|---|
| Ni | 47.6 |
| Co | 0.031 |
| Cu | 0.004 |
| Fe | 0.0074 |
| $S_T$ | 2.05 |
| $SO_4^=$ | 2.05 |
| Mg | 0.066 |
| Mn | 0.012 |
| Zn | 0.071 |
| Al | <0.001 |
| Ca | <0.001 |
| $SiO_2$ | 0.038 |
| $NH_{3T}$ | 0.315 |
| $CO_2$ | 3.4 |

A sample of this basic nickel carbonate was repulp washed once with distilled water, slurried with water and charged into a laboratory reduction autoclave. Sufficient ammonia was added (as $(NH_4)_2CO_3$) to tie up all sulphur in the slurry, as $(NH_4)_2SO_4$. Reduction was conducted as in Examples 1 and 2 at 175° C. under 350 p.s.i.g. hydrogen overpressure. Reduction particulars are shown in Table X.

TABLE X

| | |
|---|---|
| Ni (g.p.l.) in reduction slurry | 60 |
| $(NH_4)_2CO_3$ (g.p.l.) added | 10.35 |
| $(NH_4)_2SO_4$ formed during reduction (g.p.l.) | 12.1 |
| Reduction time (min.) | 35 |
| Reduction-end Solution pH | 7.1 |

The reduced nickel powder product was separated from the reduction end solution and impurities residue and split into two parts. One part of the powder was acid washed twice with 0.5% $H_2SO_4$ then washed three times with distilled water. The remaining part was repulp washed five times with tap water only. All washes were conducted at room temperature for 15 minutes with rapid agitation followed by decantation. The analyses of the powders are presented in Table XI.

TABLE XI

| | Acid washed | Not acid washed |
|---|---|---|
| $S_T$ | 0.014 | 0.016 |
| C | 0.020 | 0.018 |
| Co | 0.048 | 0.044 |
| Cu | 0.0085 | 0.0084 |
| Fe | 0.0017 | 0.0031 |
| Mg | 0.0002 | 0.0012 |
| Mn | 0.0004 | 0.0005 |
| Zn | 0.004 | 0.012 |
| Al | <0.001 | 0.001 |
| Ca | <0.001 | 0.0016 |
| $O_2$ | 0.25 | 0.25 |

EXAMPLE 4

This example illustrates the practice of the invention using a plurality of reductions (or densifications) and with recycle of reduction end solution from each reduction to the subsequent reduction operation. The impure basic nickel carbonate treated in this example analyzed (wt. percent):

| | |
|---|---|
| Ni | 50.0 |
| Co | 0.054 |
| Fe | 0.025 |
| $S_T$ | 1.72 |
| $S(SO_4)$ | 0.513 |
| $NH_{3T}$ | 0.64 |
| $CO_2$ | 7.62 |
| Mg | 0.131 |
| Mn | 0.275 |
| Zn | 0.185 |
| Al | 0.001 |

For the initial, or nucleation, reduction cycle, 770 grams of this material were slurried with water to provide a total reduction charge of 200 mls. which was placed into an agitator equipped, 1 gallon laboratory autoclave. For each subsequent reduction cycle, reduction end solution from the preceding reduction cycle was used to repulp the next batch of impure basic nickel carbonate. For each cycle, the reduction feed slurry was subjected to oxidation for 30 minutes at 175° C. under 50 p.s.i.g. oxygen overpressure. Ammonia was added to neutralize acid produced as a result of the release of $SO_4^{--}$ ions during reduction thereby ensuring essentially a neutral reduction end solution.

The autoclave was purged with nitrogen and the slurry contacted with hydrogen at 175° C. and under 350 p.s.i.g. hydrogen overpressure. Reduction was complete in 20 minutes or less in each cycle. In order to concentrate the reduction end solution, at the end of each reduction cycle the agitator was stopped and about 1200 mls. of solution was flashed from the autoclave. The agitator was started again, the autoclave was cooled and discharged and nickel powder was separated from the reduction end solution by magnetic decantation. This solution bearing finely divided impurity precipitates was combined with the flashed solution, stirred and allowed to settle for 5 minutes. 1500 mls. of overflow was then used to repulp the next batch of basic nickel carbonate. The non-magnetic solids were filtered off, water washed, dried, combined and analyzed as one run precipitate. The filtered solutions were analyzed separately. The reduction particulars are shown in Table XII, the analyses of the nickel powder products in Table XIII and the analyses of the reduction end solution and combined impurities precipitate in Table XIV.

TABLE XII

| Cycle number | Nucl. | D1 | D2 | D3 | D4 | D5 | D6 | D7 | D |
|---|---|---|---|---|---|---|---|---|---|
| $NH_3$ added (g.p.l.) | 2.5 | 2.5 | 2.5 | 2.5 | 2.5 | 2.5 | 2.5 | 2.5 | 2.5 |
| Reduction time (mins.) | 20 | 5 | 5 | 5 | 5 | 6 | 8 | 13 | 15 |
| Reduction-end solution (mls.) | 1,630 | 1,750 | 1,730 | 1,680 | 1,760 | 1,700 | 1,740 | 1,590 | 1,860 |
| Reduction-end solution (pH) | 7.4 | 7.1 | 7.2 | 7.2 | 7.2 | 7.3 | 7.3 | 7.2 | 7.2 |
| Solution recycled (mls.) | 1,500 | 1,300 | 1,500 | 1,500 | 1,500 | 1,500 | 1,500 | 1,500 | |

What we claim as new and desired to protect by Letters Patent of the United States is:

1. A process for producing substantially pure nickel powder from basic nickel carbonate containing sulphur and other undesirable impurities including at least one of magnesium, aluminum, manganese, cobalt and zinc which comprises the steps of making up a slurry of said impurity-containing basic nickel carbonate in aqueous media, contacting said slurry with a free oxygen bearing gas at elevated temperature and pressure to oxidize any sulphur in said slurry which is not in sulphate form to sulphate form, reacting the slurry from said sulphur oxidizing step with hydrogen at a temperature above about 80° C. under a partial pressure of hydrogen above about 100 p.s.i. to convert substantially all nickel in said basic nickel carbonate to elemental nickel powder, providing a compatible acid neutralizing reagent in the slurry treated in said hydrogen reaction step, said reagent being provided in an amount equivalent to at least 1.8 moles of ammonia for each mole of sulphur contained in said slurry and to ensure that the pH of said aqueous media is above about 3.5 at the completion of said hydrogen reaction step whereby said undesirable impurities report with said nickel powder as a solid impurities containing residue, physically separating said nickel powder from said aqueous media and from said impurities containing residue and washing said nickel powder to remove substantially all residual impurities from said nickel powder.

2. The process according to claim 1 wherein said reaction with free-oxygen containing gas is conducted at a temperature within the range of about 65° C. to about 260° C. under a partial pressure of oxygen above about 5 p.s.i.

3. The process according to claim 2 wherein the reaction is conducted at a temperature between about 175° C. and 230° C. and under an oxygen overpressure between about 20 and about 50 p.s.i.

4. The process according to claim 1 wherein the acid neutralizing reagent is ammonia.

5. The process according to claim 4 wherein ammonia is added in amount equivalent to 2 or more moles per mole of sulphur in the slurry.

6. The process according to claim 1 wherein said nickel powder is separated from said aqueous media and impurity residue by magnetic decantation.

7. The process according to claim 1 wherein the reaction with hydrogen is carried out at a temperature within the range of about 80° C. to about 325° C. under a partial pressure of hydrogen within the range of about 100 p.s.i. to about 500 p.s.i.

8. The process according to claim 1 wherein the nickel powder is washed with a weak solution of sulphuric acid.

9. The process according to claim 8 wherein the wash solution is recycled to the slurry make-up step.

10. The process according to claim 1 wherein a plurality of successive slurry make-up, sulphur oxidizing, acid neutralizing reagent providing hydrogen reaction operations are conducted and at least a portion of the aqueous media separated from the nickel powder and impurities residue is recycled and used for the next following slurry make-up operation.

11. The process according to claim 10 wherein the nickel powder from each hydrogen reaction operation is retained in the reaction vessel until up to about 50 hydrogen reaction operations have been completed.

12. The process according to claim 10 wherein the concentration of basic nickel carbonate in the slurry and the quantity of aqueous media recycled are controlled to maintain about 40 to 60 g.p.l. of soluble sulphur compound in the feed to the hydrogen reaction operation.

13. The process according to claim 1 wherein said compatible acid neutralizing reagent is provided in amount sufficient to ensure that the pH of the aqueous media is within the range of about 5 to about 7 at the completion of said hydrogen reaction step.

14. The process for recovering substantially pure nickel in elemental powder form from substantially cobalt free ammoniacal nickel ammonium carbonate solutions contaminated with sulphur, zinc, magnesium and at least one of iron, aluminum and manganese which comprises reacting the solution with a free oxygen-bearing oxidizing gas at a partial pressure of oxygen of at least 5 p.s.i. and at a temperature within the range of 65° C. to 175° C. for a period of time sufficient to ensure that substantially all sulphur values in the solution are oxidized to sulphate form and to precipitate iron, aluminum and manganese contaminants as hydroxides, separating said hydroxides precipitate from the solution, heating the solution to remove ammonia and carbon dioxide and precipitate substantially all dissolved nickel values as basic nickel carbonate, separating sufficient barren solution from the basic nickel carbonate precipitate to form a concentrated aqueous slurry of said basic nickel carbonate containing the equivalent of about 40 to about 150 g.p.l. of nickel, determining the total sulphur content of said slurry, adjusting the ammonia content of said slurry in relation to said determined total sulphur content such that there is at least 1.8 moles of ammonia available in the system for each mole of sulphur, reacting the so-adjusted system with hydrogen at a temperature above about 80° C. under a partial pressure of hydrogen above about 100 p.s.i. to precipitate elemental nickel particles and a solid residue containing impurity metal compounds, physically separating precipitated nickel particles from the reduction end solution and said solid residue, washing said powder with a weak acid solution to remove substantially all residual contaminants therefrom and recovering the resulting nickel powder product.

15. The process for recovering substantially pure nickel in elemental powder form from substantially copper free, cobalt containing ammoniacal nickel ammonium carbonate solutions contaminated with sulphur, zinc, magnesium and at least one of iron, aluminum and manganese which comprises reacting the solution with a free oxygen-bearing oxidizing gas at a partial pressure of oxygen of at least 5 p.s.i. and at a temperature within the range of 65° C. to 175° C. for a period of time sufficient to ensure that substantially all sulphur values in the solution are oxidized to sulphate form, all cobalt values are oxidized to cobaltic form and to precipitate iron, aluminum and manganese contaminants as hydroxides, separating said hydroxides precipitate from the solution, heating the solution to precipitate substantially all dissolved nickel values as basic nickel carbonate, separating barren solution from the basic nickel carbonate and forming a concentrated aqueous slurry of said basic nickel carbonate containing the equivalent of about 40 to about 150 g.p.l. of nickel, determining the total sulphur content of said slurry, adjusting the ammonia content of said slurry in relation to said determined total sulphur content such that there is about 1.8 moles of ammonia available in the slurry for each mole of sulphur, reacting the so-adjusted system with hydrogen at a temperature above about 80° C. under a partial pressure of hydrogen above about 100 p.s.i. to precipitate elemental nickel particles and a solid residue containing cobalt and other metal impurities in compound form, separating precipitated nickel particles from the reduction end solution and said solid residue, washing said particles with a weak acid solution to remove substantially all residual contaminants therefrom and recovering the resulting nickel powder product.

References Cited

UNITED STATES PATENTS

| | | | |
|---|---|---|---|
| 3,674,465 | 7/1972 | Evans et al. | 75—108 |
| 3,640,706 | 2/1972 | Zubryckyj et al. | 75—119 X |
| 3,141,765 | 7/1964 | Brown et al. | 75—119 X |
| 3,293,027 | 12/1966 | Mackiw et al. | 75—119 |

FOREIGN PATENTS

| | | | |
|---|---|---|---|
| 811,079 | 4/1969 | Canada | 75—119 |

HERBERT T. CARTER, Primary Examiner

U.S. Cl. X.R.
75—103, 119, 0.5 A